United States Patent [19]

Matsui

[11] Patent Number: 4,561,153

[45] Date of Patent: Dec. 31, 1985

[54] CABLE CLAMP

[75] Inventor: Kazuhiro Matsui, Toyoake, Japan

[73] Assignee: Kitagawa Industries Co., Ltd., Nagoya, Japan

[21] Appl. No.: 547,677

[22] Filed: Nov. 1, 1983

Related U.S. Application Data

[63] Continuation of Ser. No. 410,585, Aug. 23, 1982.

[30] Foreign Application Priority Data

Aug. 27, 1981 [JP] Japan .................. 56-126760

[51] Int. Cl.[4] .............................................. B65D 63/00
[52] U.S. Cl. .............................. 24/16 PB; 24/17 AP; 248/74.4
[58] Field of Search ............ 24/16 PB, 17 AP, 30.5 P, 24/150 R; 248/74.3, 74.4, 74.5, 73, 71; 411/41, 44, 508

[56] References Cited

U.S. PATENT DOCUMENTS

| | | | |
|---|---|---|---|
| 1,873,893 | 8/1932 | Jones | 248/74.3 |
| 2,318,853 | 5/1943 | Hall | 248/73 |
| 2,445,481 | 7/1948 | Ge Wertz | 248/74.5 |
| 2,969,216 | 1/1961 | Hallsey | 248/71 |
| 3,144,695 | 8/1964 | Budwig | 24/74.5 |
| 3,465,992 | 9/1969 | Schuplin | 248/71 |
| 3,529,795 | 9/1970 | Van Niel | 24/16 PB |
| 3,719,971 | 3/1973 | Lodi | 248/73 |
| 3,748,696 | 7/1973 | Martin | 24/150 R |
| 3,757,389 | 9/1973 | Wiland | 24/150 R |
| 3,758,060 | 9/1973 | Schuplin | 24/16 PB |
| 4,010,503 | 3/1977 | Denton | 24/16 PB |
| 4,312,614 | 1/1982 | Palmer et al. | 411/44 |
| 4,342,438 | 8/1982 | Speedie | 248/73 |

FOREIGN PATENT DOCUMENTS

| | | | |
|---|---|---|---|
| 10499 | 8/1975 | Japan . | |
| 875935 | 8/1961 | United Kingdom | 24/16 PB |
| 1540412 | 2/1979 | United Kingdom | 248/74.5 |

*Primary Examiner*—Victor N. Sakran
*Attorney, Agent, or Firm*—Oblon, Fisher, Spivak, McClelland & Maier

[57] ABSTRACT

In a cable clamp wherein both ends of a resilient plastic band are combined into a ring and cables are attached to a base and fixed, an engaging projection of suggital shape is provided near the ring end at one end portion of the band and directed to surface of other end portion, a hole through which the engaging projection passes is provided on surface of other end portion which is bent in direction of the engaging projection, and the engaging projection is forced through the through hole into an attaching hole provided on the base, thereby the cables are bundled and fixed on the base. The cable clamp can be fixed to the base readily in single finger motion and does not become shaky on the base.

1 Claim, 7 Drawing Figures

CABLE CLAMP

This is a continuation of application Ser. No. 410,585 filed Aug. 23, 1982.

BACKGROUND OF THE INVENTION

1. Field of the Invention

The present invention relates to cable clamps to bundle cables after wiring and fix them on a print board, a chassis or a panel.

2. Description of the Prior Art

In a cable clamp 1 of the prior art in which both ends of a resilient plastic band are fixed on a base to constitute a ring and cables are bundled and fixed therein, as shown in FIG. 1 cables are entered through an open end and then a screw is inserted in holes 2, 3 which are provided on both ends of the band in engagement thereby the cables are fixed on a base 4. Such construction has disadvantages in that both hands must be used when installing the cable clamp and a tool such as a driver must be used for the secure fixing.

In an improved cable clamp 5 as shown in FIG. 2, combination of both end portions 7, 8 of a resilient plastic band constitutes a ring, and one end portion 8 is bent in opposite direction to other end portion. An engaging projection 9 of wedge shape is formed near top end of the end portion 8 and extends in perpendicular direction to the surface of the end portion 8 and towards other end portion 7. The surface of the end portion 7 is flat and provided with a hole 10 through which the engaging projection 9 passes.

The cable clamp 5 in such construction is convenient to bundle cables 13 and fix them on the base 4. A workman can enter the cable 13 through the open end of the band 6 and depress the end portion 8 so as to force the engaging projection 9 through the hole 10 into an attaching hole 12 provided on the base 4 for engaging the projection 9 with the attaching hole 12. In this construction, the cables 13 can be bundled and at the same time the cable clamp 5 can be fixed to the base 4 in single finger motion.

Although the above-mentioned cable clamp 5 can bundle the cables 13 and fix them on the base 4 readily, if each cable 13 has large diameter or there are a number of cables 13, as shown in FIG. 4 the end portion 8 may be raised near the bent portion as designated by reference numeral 14, and the engaging projection 9 is pivoted upwards with top end 15 of the end portion 8 acting as a fulcrum and is apt to be pulled out of the attaching hole 12. Moreover, since the cable clamp 5 is held on the base 4 only by a force in opposite direction to insertion of the engaging projection (direction of arrow 16) based on resiliency of the band 6, it is apt to become shaky on the base 4.

SUMMARY OF THE INVENTION

An object of the present invention is to provide a cable clamp in which above-mentioned defects are eliminated. In other words, subject-matter of the present invention is in a cable clamp to fix cables by combining both ends of a resilient plastic band into a ring and attaching the band to a base, wherein an engaging projection of wedge shape is provided near the ring end at one end portion of the band and directed to surface of other end portion, a hole through which the engaging projection passes is provided on surface of other end portion which is bent in the direction of the engaging projection, and the engaging projection is forced through the through hole into an attaching hole provided on the base, thereby the cables are bundled and fixed on the base.

DETAILED DESCRIPTION OF THE INVENTION

Figure 1:
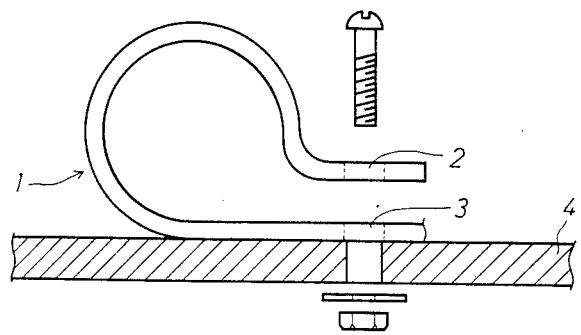
FIG. 1 and FIG. 2 (a), (b) are side views illustrating a cable clamp in the prior art.
Figure 2A:
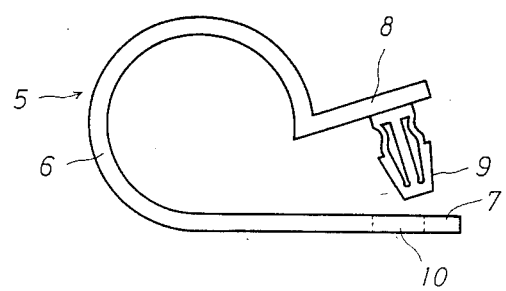
Figure 2B:
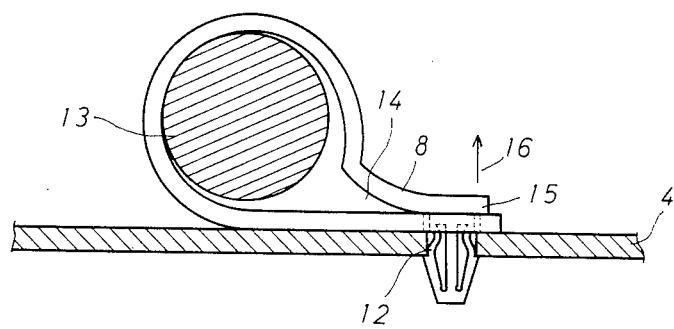
Figure 3A:
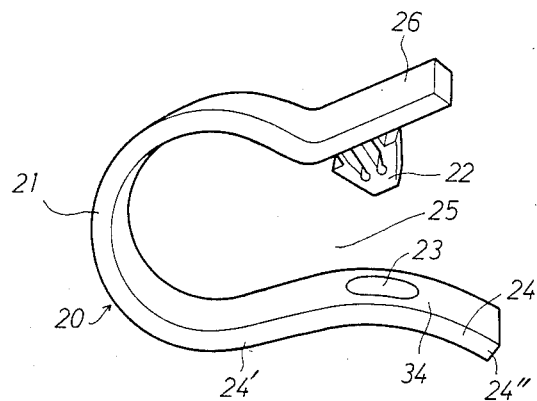
FIG. 3 (a) is a perspective view of a cable clamp as a first embodiment of the present invention, and FIG. 3 (b) is a partly enlarged side view of FIG. 3 (a)
Figure 3B:
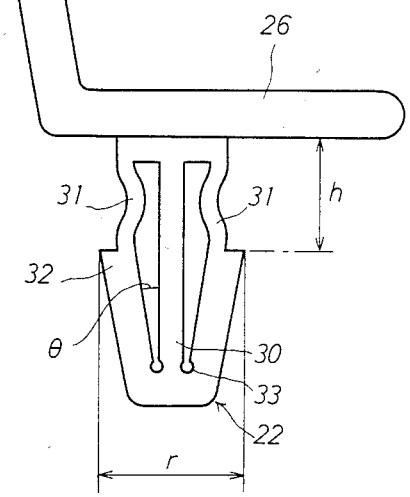

In FIG. 3 illustrating a first embodiment of the present invention, one end portion 26 of a resilient plastic band 21 is bent slightly with a small diameter and in opposite direction to other end portion 24. An engaging projection 22 of wedge shape is provided near the ring end at one end portion 26 of the band 21 and extends in perpendicular direction to the surface of the end portion 26 and towards surface 34 of the end portion 24. The end portion 24 is provided in its surface 34 with a through hole 23 having an inner diameter sized to enable the engaging projection 22 to pass through. The end portion 24 is longitudinally curved in arcuate shape about the through hole 23 towards the direction of the engaging projection 22. The band 21 has an open end 25 and is formed in approximately U-shape as a whole and molded integrally with the engaging projection 22.

Referring to FIG. 3 (b), the engaging projection 22 comprises a stem 30 at the center and engaging elements 32 each extending from top end of the stem 30 upwards at attaching angle ($\theta$). A notch 33 is provided on attaching portion of each engaging element 32 with the stem 30 so as to facilitate the decrease and restoration of attaching angle ($\theta$) of the engaging element 32 during engaging operation. A stopper element 31 extends from upper end of the engaging element near the stem 30, and other end of the stopper 31 is connected to the end portion 26 of the band 21. Distance h from surface of the end portion 26 having the engaging projection 22 to upper end of the engaging element 32 is a little greater than sum of thickness of other end portion 24 of the band 21 with thickness of a base described later. The stopper element 31 contacts with the inner circumference of an attaching hole 28 described later so that, when the cable clamp 20 is pulled, the engaging elements 32 are not opened beyond the necessary extent by the pulling force.

Figure 4:
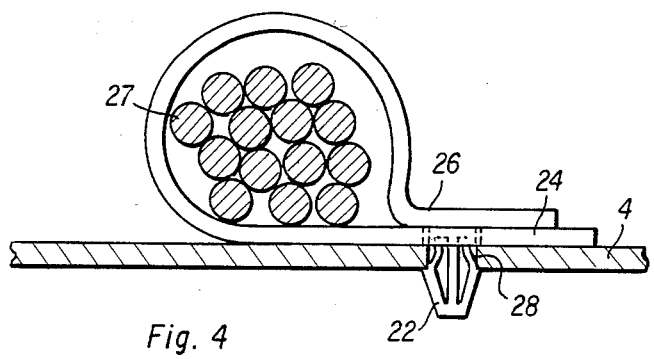
FIG. 4 is a side view illustrating the use state of the first embodiment.

When the cable clamp 20 in the first embodiment of the present invention is used, cables 27 are inserted through the open end 25 of the band 21, and then as shown in FIG. 4 the end portion 26 is depressed so that the engaging projection 22 passes through the hole 23 and is further forced into the attaching hole 28 which is provided on the base 4 and has diameter slightly smaller than maximum diameter (r) of the engaging projection 22, thereby cables 27 are bundled and fixed to the base. Since the engaging projection 22 is provided near the ring end of the band 21, even when a number of the cables 27 are inserted or diameter of each cable 27 is large, the engaging projection 22 is not pulled out of the attaching hole 28 by lever action about top end of the end portion 26 as a fulcrum. Since the end portion 24 is curved in arcuate shape about the through hole 23, when the cable clamp 20 is attached to the base, by applying pressure to the end portion 26 and forcing the engaging projection 22 into the attaching hole 28, the curved portion of the surface 34 becomes flat along surface of the base 4, and by removing the pressure of the end portion 26 after completion of engagement between the engaging projection 22 and the attaching hole 28, the engaging projection 22 is pulled in opposite direction to the depression by means of resiliency of the base 21 and the curved portion of the end portion 24 is apt to restore to curved state again by strong resiliency thereby surface of the base 4 is pushed by portion near ends of the curved portion (24') (24"). The base 4 is pushed at front and rear surfaces by the engaging elements 32 of the engaging projection 22 and the portion (24') (24") near ends of the curved portion thereby the cable clamp 20 is fixed to the base 4 securely.

Figure 5:
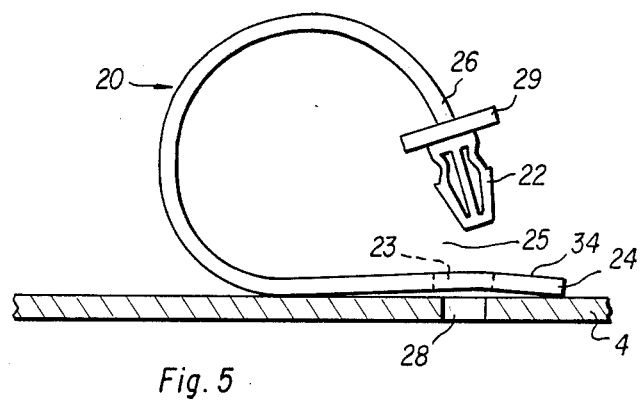
FIG. 5 is a side view illustrating a second embodiment.

In a second embodiment as shown in FIG. 5, an arcuate curve in the end portion 24 and the through hole 23 for passing the projection are formed in similar configuration to the first embodiment. The end portion 26 is provided with the engaging projection 22 formed as an extension of the belt 21 through a pushing element 29 with a diameter larger than the through hole 23.

In the second embodiment, cables are entered through the open end 25 in the band 21 and the engaging projection 22 is inserted through the hole 23 and forced into the attaching hole 28 on the base 4 whereby the cables are bundled and fixed to the base 4.

As above described, in a cable clamp of the present invention, an engaging projection to be attached to a base is provided near a ring end at one end portion of a band, a hole through which the engaging projection passes is provided on other end portion of the band, and the end portion is curved in arcuate shape in the direction of the engaging projection about the through hole, thereby cables can be bundled and at the same time the cable clamp can be fixed to the band in single finger operation. Since the base is grasped at front and rear surfaces by co-operation of the curved portion and engaging elements of the engaging projection, the cable clamp does not become shaky on the base. Furthermore, since the engaging projection is provided near the ring end of the band, the cable clamp of the present invention has effect that the engaging projection is not pulled out of the attaching hole even when a number of cables are inserted or outer diameter of each cable is large.

What is claimed is:

1. A cable clamp for securement of cables to a base comprising:

a resilient plastic band having a first end and a second end, said band being bendable in an arcuate shape about a center of curvature on one side of said band such that said first and second ends may approach one another, said second end being preformed with a longitudinal curve having a center of curvature on a side of said band opposite said one side;

a hole in said band along said longitudinal curve adjacent said second end;

a wedge shaped engaging projection having a larger end fixed to said band at said first end opposite said longitudinal curve and extending parallel to the length of said first end for insertion into a hole in said base; and a pushing element formed between said first end and said engaging projection, said pushing element being engaged with said second end whereby when said engaging projection is inserted through a hole in a flat base located at said opposite side of said band, said longitudinal curve biases said pushing element away from said base so as to secure said clamp and to secure said cables in said clamp.

* * * * *